United States Patent [19]
Van Steenbrugge

[11] Patent Number: 5,448,554
[45] Date of Patent: Sep. 5, 1995

[54] DATA COMMUNICATION SYSTEM BASED ON A SERIAL BUS AND A MONITOR STATION FOR USE WITH SUCH SYSTEM

[75] Inventor: Bernard Van Steenbrugge, Eindhoven, Netherlands

[73] Assignee: U.S. Philips Corporation, New York, N.Y.

[21] Appl. No.: 333,118

[22] Filed: Nov. 1, 1994

Related U.S. Application Data

[63] Continuation of Ser. No. 111,036, Aug. 24, 1993, abandoned, which is a continuation of Ser. No. 830,031, Jan. 30, 1992, abandoned.

[30] Foreign Application Priority Data

Feb. 4, 1991 [EP] European Pat. Off. ............ 91200213

[51] Int. Cl.⁶ .................. H04L 12/26; H04J 3/14
[52] U.S. Cl. .................. 370/17; 371/20.1; 371/29.5; 375/224; 395/500; 395/183.04
[58] Field of Search .................. 320/13, 17, 16, 16.1, 320/85.1, 85.2, 85.3, 85.4, 85.5, 85.11, 85.12, 85.15; 371/20.1, 20.6, 24, 25.1, 29.1, 29.5; 375/10

[56] References Cited

U.S. PATENT DOCUMENTS

| | | |
|---|---|---|
| 4,429,384 | 1/1984 | Kaplinsky . |
| 4,672,611 | 6/1987 | Fukuhara et al. .................. 371/29.1 |
| 4,689,740 | 8/1987 | Moelands et al. . |
| 4,799,211 | 1/1989 | Felker et al. .................. 370/17 |
| 4,817,080 | 3/1989 | Soha .................. 370/17 |
| 4,887,262 | 12/1989 | Van Veldhuizen .................. 370/85.1 |
| 4,896,315 | 1/1990 | Felker et al. .................. 370/17 |
| 5,101,402 | 3/1992 | Chui et al. .................. 370/17 |
| 5,111,460 | 5/1992 | Botzenhardt et al. .................. 371/29.1 |

OTHER PUBLICATIONS

P. A. Kidd et al., "The Olivetti Network Monitor", Local Networks & Distributed Office Systems, vol. 2, 1982, pp. 509–519.

Primary Examiner—Wellington Chin
Attorney, Agent, or Firm—Anne E. Barschall

[57] ABSTRACT

A data communication system based on a serial bus and a monitor station for use with such system.

A data communication system is based on a serial bus. It comprises transmitter stations and receiver stations. Frames have a sequence of start signals, address signals, and further signals, and also include control signals, and support an in-frame dialog between master and slave. A monitor station is also present and, irrespective of the source of a particular bit allows for sampling such bit in that it emulates an uncommitted slave station.

16 Claims, 3 Drawing Sheets

|     | B7 | B6 | B5 | B4 | B3 | B2 | B1 | B0 |
| --- | --- | --- | --- | --- | --- | --- | --- | --- |
| B1  | 17 |    |    |    |    |    |    |    |
| B2  |    | 26 |    |    |    |    |    |    |
| B3  |    |    | 35 |    |    |    |    |    |
| 4   |    |    |    | 44 |    |    |    |    |
| 5   |    |    |    |    | 53 |    |    |    |
| 6   |    |    |    |    |    | 62 |    |    |
| 7   |    |    |    |    |    |    | 71 |    |
| 8   |    |    |    |    |    |    |    | 80 |
| 9   |    |    |    |    |    |    |    |    |
| 10  |    |    |    |    |    |    |    |    |
| 11  |    |    |    |    |    |    |    |    |
| 12  |    |    |    |    |    |    |    |    |
| 13  |    |    |    |    |    |    |    |    |

FIG.5

DATA COMMUNICATION SYSTEM BASED ON A SERIAL BUS AND A MONITOR STATION FOR USE WITH SUCH SYSTEM

This is a continuation of application Ser. No. 08/111,036, filed on Aug. 24, 1993, abandoned, which is a continuation of Ser. No. 07/830,031, filed on Jan. 30, 1992, abandoned.

BACKGROUND TO THE INVENTION

The invention relates to a data communication system based on a serial bus with a plurality of transmitter and/or receiver stations attached for intercommunicating multibit messages organized in physical frames that contain a sequence of a start signal, address signals and further signals, and also containing control signals, any said frame supporting an in-frame dialog in that it comprises both write information and read information as pertaining to art actual master station.

A single-channel bus has been described in U.S. Pat. No. 4,429,384 (PHN 9737), herein corporated by reference. Such a communication bus is particularly suited for transfer of control signals between various devices for consumer entertainment, devices for executing household chores, and devices for producing various maintenance and management control signals in a domestic environment. A different kind of serial bus has been disclosed in U.S. Pat. No. 4,689,740. This particular serial bus has separate clock and data wires. A still different set-up is a single data wire, a single clock wire, and a single word enable wire. A still different set-up is a single data wire, a single bit synchronization wire, and a single word synchronization wire. Serial in this context means that the information transmitted is represented by at most two wire signals, wherein in the case of two wires the information bit stream is represented by a logic combination between the signals on the two wires. Examples are an EXOR-function and a realization by a twisted or balanced wire pair, wherein the information is embodied by mutually opposite signals on the two wires. Apart from the one or two information-carrying wires, any other wire is exclusively used for controlling and/or synchronizing the transfer. For simplicity, only the system according to the first referenced patent is considered hereinafter. Now, a realistic system of course has at least one transmitter station and also at least one receiver station. Another discrimination is between master station and slave station. The master generally synchronizes the transfer in the context of the overall frame. Various different communication configurations such as one-to-one, one-to-many and others are common general knowledge. Now, the frame generally has a sequence of a start bit, mode bits indicating the intended transmission frequency, a master address, a slave address and data. Also, further control bits have been defined and allowance has been made for returning acknowledgement by the receiver, which in principle may be the master as well as the slave. A positive acknowledgement opens the way for a next transfer (such as a next byte). A negative acknowledgement may induce a repeat transmission. Inasmuch as on the bit level master and slave are only weakly interrelated, the particular outcome of the transfer may have appreciable effects on further synchronization. Now, other bus organizations have different standards for the start signals, the address signals, the control signals and the further signals, the latter of course also covering the data signals that would represent the information that the slave or destination station would really need. In certain situations, the transmitter may operate as master (i.e. synchronizer station) and the receiver as slave, but this is not a prerequisite, inasmuch as also the message may have the destination station as synchronizer. Also, a separate synchronizer station may be present.

A communication system is used with respect to stations that are manufactured by various different manufacturing entities. It has been found advisable to be able to test such stations for correct functioning by a monitor station. The station function so tested may be for correct interaction with the bus proper on a protocol level, or alternatively on the level of correct execution of an application program on a debug level. Furthermore, it may be the bus itself that is the subject of the test.

SUMMARY OF THE INVENTION

Accordingly, amongst other things, it is an object of the present invention to provide a system as set out and provided with a monitor station for allowing flexible testing. According to one of its aspects, the invention realizes the object in that it comprises both write information and read information as pertaining to an actual master station, said system also comprising a monitor station comprising a bus interface for with respect to any prevailing bus signal and irrespective of such signal's source station emulating an uncommitted receiver station, and a frame buffer fed unconditionally by said interface for storing uniformly relevant parts of any frame received. The bus interface controls the reception of the frames under bus synchronization. The frame buffer allows for intermediate storage up till such time when further processing or evaluation is necessary or feasible. The storage is uniform among the frames, so that any frame leads to the same amount of storage (if the frame has been found useful, because in principle, rejection of a bad frame is possible before its contents could even be considered). For example, if the frame is in discord with timing requirements, it could never contain viable information. Further, the storage is irrespective of the actual source of the bit in question, so that the complete aspects of the dialog can be discerned. Several particularities of such emulation of an uncommitted receiver will be explained hereinafter.

Advantageously, said frame buffer comprises two sections that each accommodate all relevant parts of at least one frame, and wherein said monitor station has control means for alternatively controlling one said section in a read mode and the other said section in a write mode. In particular, besides accommodating as well as possible to the bus protocol in the write section, the read section could be used by the evaluation either on the basis of its own content, or on the basis of the frame to be stored thereafter in the write section. This enhances flexibility of procedure in that the outcome of a test may entail also using one or more ,earlier frames. This provision on a hardware level in the frame buffer enhances speed enormously.

Advantageously, said monitor station furthermore comprising masked comparator means for comparing any unmasked part from any frame communicated on said bus with one or more corresponding standard part's contents, and gating means fed by said frame buffer for under control of an "equal" signal from said comparator means gating the relevant parts of the associated frame to a test data processing means. After provisional buffering until equality or difference of the unmasked section(s) with respect to the standard section(s) has been determined and the gating may either transfer the whole frame, or only a secondary selected part thereof to the data processing means. The storage in the frame is unconditionally with respect to the message as a whole. As to the specific parts thereof in a particular test this storage is uniform for all frames, but also certain parts of the frames may be uniformly disregarded, such as, for example, the start signal. The storage may continue up to the end of the message. Alternatively, it may discontinue as soon as any discrepancy (= not equal) has been met. The equality may mean equal to one particular information content; equality to any of a plurality of information contents; or equality to any content within a specified range of information contents. Generally, the hardware filtering in the monitor station allows top speed.

FURTHER ASPECTS OF THE INVENTION

Advantageously, said test data processing means comprises display means for displaying test evaluation data, such as statistical data with respect to mode type, source address, destination address, control information, or, alternatively message content, error occurrence, repeats requested, irresponsive destinations and various others. The term display is herein understood to include printing or otherwise hardcopying. The display may be symbolic, such as translating a particular occurrence in a verbal representation thereof, such as: "station Y is non-responsive to station X", "tabular statistics rendered as histogram or pie", "timing data rendered as pictorial track", etcetera.

Selection of a particular information for forwarding to the test evaluation means can be conditional on two levels, first whether a particular frame is selected anyway, and second, in that the part(s) thereof forwarded may be codetermined by the content proper of that frame, or of another frame. The organization of the two buffer sections advantageously is that one single-frame buffer is controlled in write mode, whereas the other section that could contain one or a plurality of sections is in the read mode with respect to the test evaluation means. Changeover to receiving a next session is effected by having selected a next one-frame section among the buffer's capacity. Another organization is by fixing the write section and between succesive frames operating a fast-copy mechanism from the write section to the read section. By it self, such mechanisms are well-known in buffering art and would not need extensive disclosure.

The invention also relates to a test monitor station for use with a data communication system based on a serial bus. Such monitor station would represent a valuable evaluation tool, especially in a multivendor environment. Advantageously, the gating means could be software controlled. This could allow for higher level testing such as measuring time delay between a particular request from a first station and the execution thereof by a second station, although response time of such software control would often be substantially higher.

In particular, said monitor station for monitoring multibit messages organized in physical frames that contain a sequence of a start signal, address signals and further signals and also contain control signals, being transmitted on said bus, said monitor station for monitoring said frames including in-frame dialog control signals as comprising both write information and read information as pertaining to an actual master station, comprising a bus interface for with respect to any prevailing bus signal and irrespective of that signal's source station emulating an uncommitted receiver station, and a frame buffer fed unconditionally by said interface for storing uniformly relevant parts of any frame received. Selection from a frame to be transmitted for further evaluation can be conditional on various levels, first whether a particular frame is selected anyway, second in that the parts thereof forwarded may be codetermined by the content proper of that frame. A convenient organization would be effected in that a particular "equal" signalization could control gating of a particular sequence length of "earlier" and/or of "later" frames, provided of course, that the buffering have adequate capacity. The monitor station would advantageously allow for sampling on both read (control) bits and also on write bits. This allows for a broad measurement scope. In particular, the monitor station would have different timings from a standard station, in that it should feature optimum reception without the normal cost versus performance trade offs that are or could be proper in a low-cost slave station. The bus in particular may be $D^2B$, which is being widely contemplated for use or future use.

Further advantageous aspects are recited in dependent claims.

BRIEF DESCRIPTION OF THE DRAWINGS

The invention will be explained and disclosed, specifically with respect to the appended Figures, wherein.

An appendix gives the various timing prescription of $D^2B$ in general and of the monitor station therefor, in particular. Moreover, the invention with appropriate and straightforward modification of the embodiment would be useful for use with other serial bus protocols.

DESCRIPTION OF A PREFERRED EMBODIMENT

Figure 1:
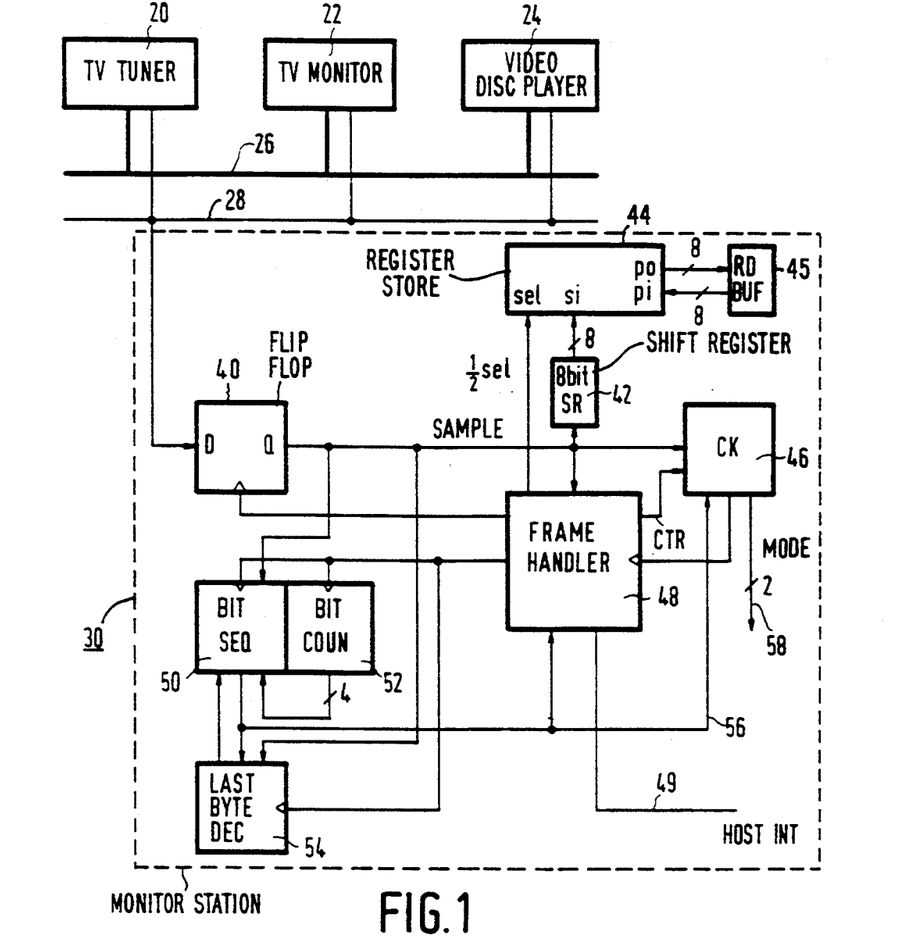
FIG. 1 is a block diagram of a data communication system with monitor station attached.

FIG. 1 is a block diagram of an example data communication system with monitor station attached. In this, block 20 represents a TV-tuner, block 22 a TV-monitor, and block 24 a video-disc player. The three block together represent the intended functionality for user entertainment. For so doing they are interconnected by a high-speed signal line 26 for communicating video signals. Furthermore, twisted pair $D^2B$ bus 28 interconnects the block 20...24 for exchanging control commands, status signals, and data that is required for assisting the user functionality. Examples are: "play", "louder", "time of day", "give status", "alarm", and many others. Furthermore, for test purposes, monitor station 30 has been attached to bus 28. It may, or may not be connected to the video bus 26. Test can mean test during or after manufacturing of the various blocks 20...24. It may also represent a specific extra user function in a consumer environment, such as for supervising a $D^2B$ system that is in use by various persons, to check for use type, use frequency, system adequacy and others. The particular functions of blocks 20...24 are not particular to the present invention, and neither is the presence of data line 26.

Figure 2:
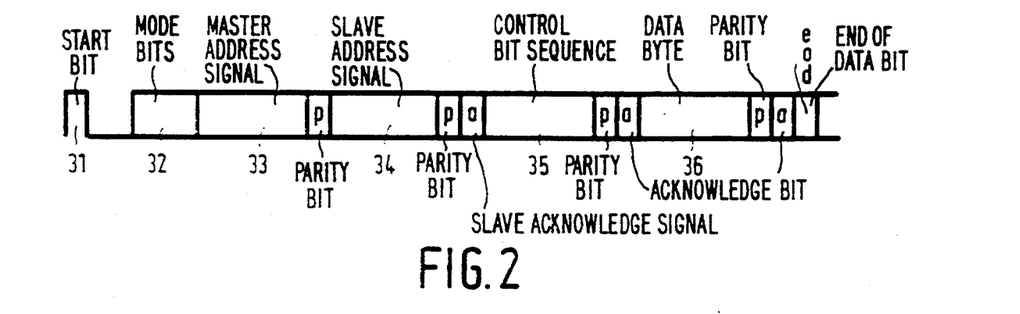
FIG. 2 shows the $D^2B$ frame format.

In this respect, FIG. 2 briefly recapitulates the D²B message/frame format. Herein, 31 symbolizes a fixed format start bit; 32 three mode bits that indicate an intended transmission speed, under control of a clock frequency that for mode 0 is 6/8 MHz, for mode 1 is 6/2 MHz, and for mode 2 is 6 MHz. Furthermore, each mode has a predetermined maximum frame length. Next follow a master address signal with associated parity bit 33, a slave address signal with associated parity bit and accommodating a slave-generated acknowledge signal 34, a control bit sequence with associated parity and acknowledge bits 35, and data byte with associated parity bit, acknowledge bit and end of data bit 36. In this example only one data byte is transferred. In case of a longer message, each byte has an end-of-data bit at a default value, whereas only the last data byte gets an active end-of-data bit. The data may go from the master to the slave, or in the reverse direction. Always, the receiver sends the acknowledge bit.

Now, in FIG. 1, monitor station 30 has the following subsystems executed in TTL, logic: sample flip flop 40, shift register 42, register store 44, clock 46, frame handler 48, bit sequencer 50, bit counter 52, last byte decoder 54. Frame handler 48 performs central control for the monitor station, which through pulse counting (of clock pulses from clock 46) determines the instant of interrogation of each incoming bit in sample flip flop 40. The number of clock pulses is prescribed for each bit category and each state (low/high) thereof. These numbers have been stored in a parameter ROM not shown, which at the beginning of the associated state or bit is read to fill a count register in clock 46 that is subsequently counted down under synchronization of clock 46's own pulses. Attainment of counter state zero first stops the counting down and, furthermore, controls a sampling instant. These sample instants have been designed for optimum interrogation reliability and differ from standard interrogation instants for a "normal" slave station. Bit sequencer 50 counts all message bits through an end-of-bit pulse from frame handler 48. Bit line 56 signals through a category code which bit category presently prevails. Bit counter 52 counts the message bits for, on the basis of the count and of the protocolled message format, determining what category the next bit belongs to, what its purpose is, and at what instants it should be interrogated. Bit sequencer 50 can thus detect the last bit of a particular message, byte, etcetera, through protocol definition of all elements of the message. Eight bit shift register 42 receives sampled bit values for series to parallel conversion as dictated by the data width of write memory 44. The latter stores one or more sequential frames under control of a select signal from frame handler 48. It has byte wide bidirectional communication with read buffer 45 of a host not shown, this host executing the evaluation and also governing the actual timing appropriate to the bus mode. Write memory 44 will be detailed hereinafter with respect to FIG. 4. Clock 46, in addition to earlier functions, also decodes the mode bits and forwards a 2-bit mode signal on line 58. After commencement of a message, first all connected stations operate in the lowest mode. Through the mode signal they may be driven to a higher bit rate frequency. Mode line 58 signals the prevailing mode (one of three). The frame handler 48 also determines whether an addressed station emits a positive or a negative acknowledge, respectively. Anyway, the acknowledge bit is always sampled. Moreover, a parity check is executed with respect to message parts received.

Particular functions of the monitor station are the following: During acknowledge bits and other slave-to-master bits no data are presented to the serial bus in contradistinction with "real" slaves. During all bits a correct sampling is specified. Various control bits are not decoded in a standard way. For example, "locking" to another station is strictly forbidden. The monitor station is able to discriminate between the master-to-slave and slave-to-master bits inasmuch as they have different timing constraints. Reset of the monitor station upon encountering an abnormal message condition, is not effected either. In general, the monitor station behaves as a slave, both for the standard bits of a frame, but also with respect to any acknowledge bit that would have to be returned by a normal slave station, not being the monitor station. So, it keeps completely silent. Write memory 44 interfaces with the host's read buffer 45 on an 8-bit-wide data level; clock 46 transmits on line 58 mode indicating bits, and frame handler 48 on line 49 forwards an interrupt bit if an end-of-frame has been found.

In general, the blocks of FIG. 1 may be built from conventional TTL building blocks.

Now, the following trigger formats may be specified by the monitor station according to the invention:
mode signals xxx
master address xxxx xxxx xxxxx
slave address xxxx xxxx xxxx
control bits xxxx The latter two categories each are provided with one acknowledge bit space. The user may now specify an arbitrary content of any of the bits or bit groups of this table to be taken into account for presenting for comparison to determine an equal/not equal situation while leaving any other bit don't care. Alternatively, respective different contents for a fraction of these bits may be specified, such as all messages that have either a particular station as master station, or a particular station as slave station. Another possibility is a set of particular addresses or a particular address range. The set of bits specified above has been chosen as a particularly advantageous one. Other bits are less interesting: data bits show too much message-to-message variation, parity bits by themselves do not represent information on the message. Now, if within a particular message an equality to the specified bits occurs, a trigger is given, which trigger is rendered definitive when the slave acknowledge bits have effectively been produced by the addressed slave station.

Figure 3:
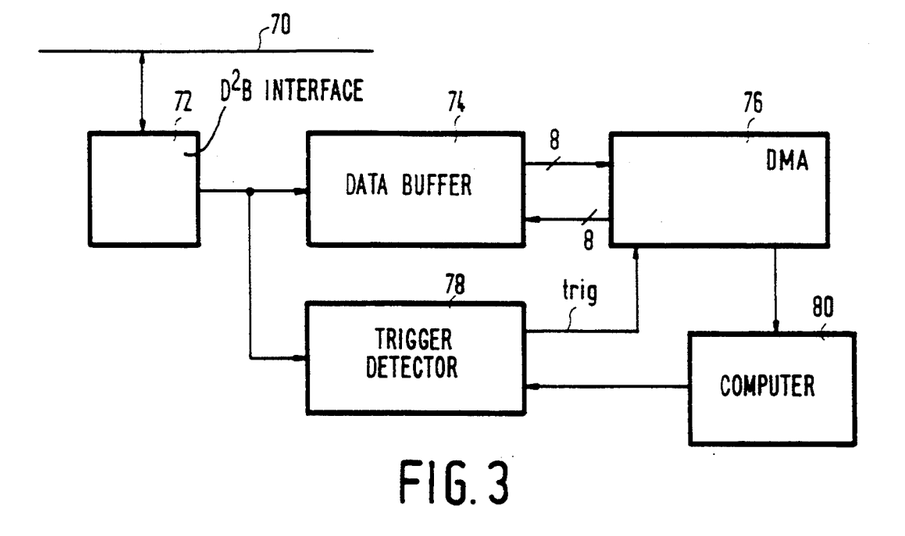
FIG. 3 is a block diagram of the overall parts of the monitor system.

FIG. 3 is a block diagram of the overall parts of the monitor system. Herein, D²B bus 70 interfaces to D²B unit 72 corresponding to device 30 in FIG. 1. As explained, device 30 allows for inspecting and monitoring any bit transferred on bus 70. Next, device 30 exchanges eight bit bytes with data buffer 74 to be described hereinafter. Data buffer 74=44 interfaces to direct memory access sequencer 76 on byte-wide address and data lines, respectively. Element 80 is a host computer of conventional structure, also encompassing read buffer 45 of FIG. 2. Element 78 is a trigger detector giving a trigger start signal to the DMA sequencer. The trigger detector receives the information for the detection from the host and compares this with the incoming samples from the bus messages. For this reason it is fed directly from the D²B interface 72. As soon as at frame's end a positive detection prevails the DMA sequencer is started for providing the host with necessary frame data. Also an accompanying interrupt not shown is produced for the host. The selection in the buffer by the DMA sequencer is on arbitrary frame bytes.

Figure 4:
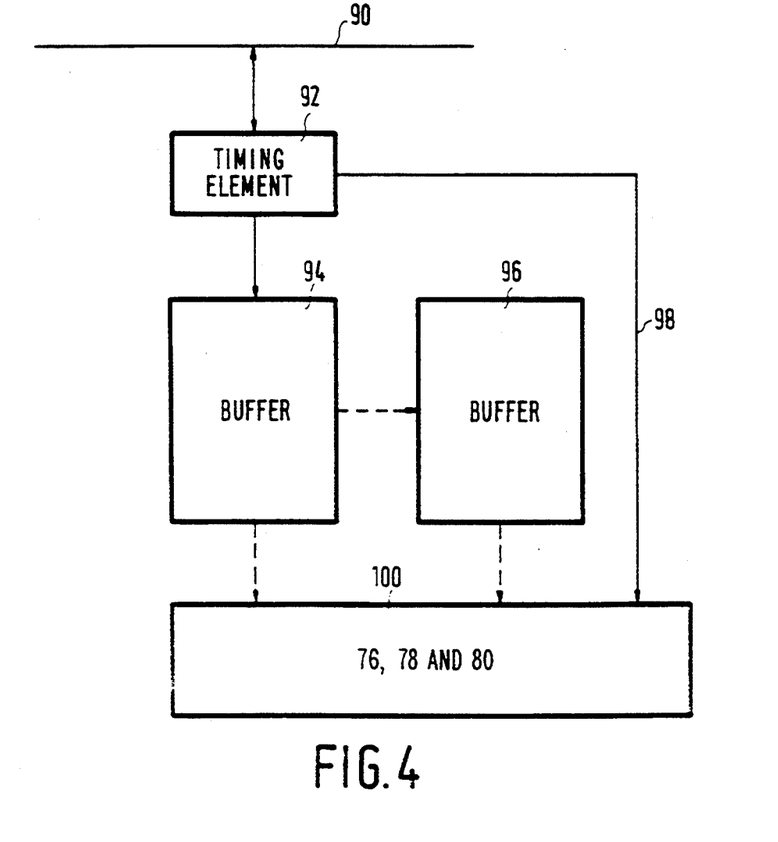
FIG. 4 is a block diagram of the buffer and its close surroundings.

FIG. 4 is a block diagram of buffer 74 and surroundings. D²B bus 90 interfaces to D²B timing element 92(=72). The buffer proper consists of two separate halves 94, 96 that each could accommodate the necessary fractions of one frame to be scrutinized. However, the buffer may alternatively contain one write section for a single frame and one read section for accommodating a sequence of earlier received frames. This allows for upon finding a positive or equal comparison in device 78 of FIG. 3 to forward selected past or history frames to host for producing a deeper evaluation of the transfer sequence. Line 98 forwards the frame items to equality detector 78 in block 100 that also symbolizes the host (100=76+78+80). Interrupted lines indicate physical or logical swapping between the sections 94, 96 (fast copying for physical swapping, address amending for logical swapping). Swapping is preferably virtual or logical as opposed to physical.

Now, each of the bits of the trigger table, supra, may be prescribed either as 1, as 0, or as don't care. First, if there is a negative slave acknowledge, the slave is operationally absent, which makes the master stop immediately, at least outside the control bits. During control bits a repeat may be effected. This convention has been described in U.S. Pat. No. 4,937,816 (PHN 12.484) to Applicant, herein incorporated by reference. Effected repeat produces trigger 1 (2-bit encoded). Upon a negative control acknowledge the master will send no further bytes. If any monitor station flip-flop has been set at that instant, the sequencer for evaluating the preceding frame part is started nevertheless; which allows for also evaluating transfers that were only partially successful. This is trigger 2. Under positive acknowledge, a series of data bytes will follow: this gives trigger 3.

Figure 5:
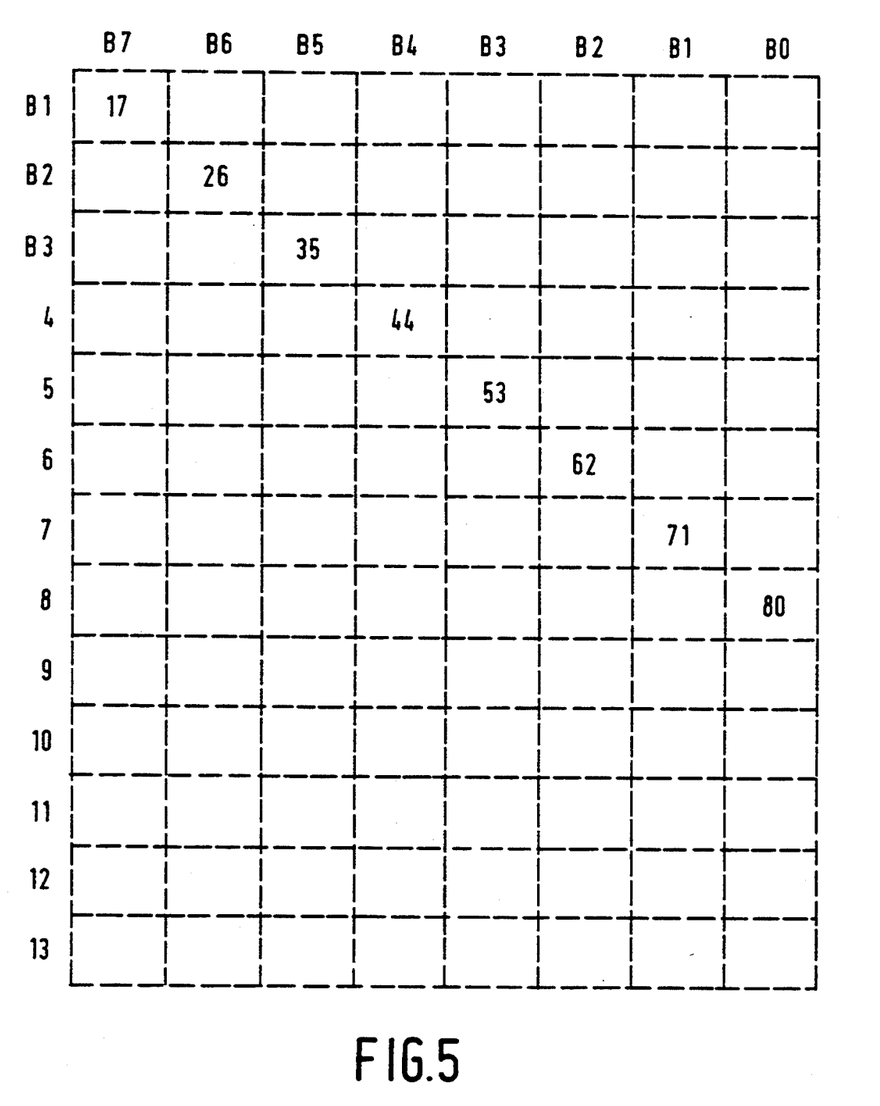
FIG. 5 is a register description of the comparator structure.

FIG. 5 gives a register description for sampling and comparing the bits of the frame to be forwarded to the host. Note that user data is not detected or stored, inasmuch as the monitor detects the overall bus-functions, not the application level. The bytes arrive sequentially from the top, the least significant bit right first. Certain nibbles are stored in encoded form as generated by the frame handler (FIG. 1). Now, byte 1 top row, indicates the number of data bytes in the message as specified by the monitor station itself, which keeps count thereof. In D²B, the number of bytes is not known in advance, because non-acknowledged bytes are repeated by the transmitter, but are monitored irrespective of the acknowledge. Protocol specifies the maximum number of data bytes per frame. For mode 0 this is 10, for mode 1 this is 43, for mode 2 this is 151; the set-up has not been extended to allow for all of full length mode 2 frames. So, 43 is encoded as 00101011, which means that bits 17, 16 are intrinsically zero. Bits 27-22 are zero, bits 21, 20 indicate the mode bit in that 00 is a mode 0 frame received, 01 is a mode 1 frame received, 10 is mode mode 2 frame passed, but not received in total, because the bit handler up to now has not been designed to handle the high speed of mode 2. Bits 37-34 are don't care, bits 33-30 give the, source address most significant nibble. Bits 47-44 and 43-40 give the middle and least significant nibbles thereof, respectively. Bits 57-54 are don't care, bits 53-50, 67-64 and 63-60 give the high, middle and least significant nibble, respectively of the destination address. bits 77-74 are don't care, bits 73-70 give the control bits indicating respectively direction, lock/nonlock, data/control status. Bits 87-80, 97-90, 107-100, 117-110, 127-120, 137-130 give the acknowledge bits of the message data bytes, up to a total of maximally 43 bytes in mode 1, which in effect means that bits 137-133 don't matter.

APPENDIX

By way of extended disclosure, hereinafter the timing of various bit categories has been given, both for standard stations and for the monitor station. All intervals have been given in clock periods.

```
Start bit:
    State(Tc)
        Condition : busin = "0" AND clcnt > 1
        Action    : busout := "1"
                    clcnt := clcnt - 1
                    state := STATE(Tc)

Condition : busin = "0" AND clcnt = 1
        Action    : busout := "1"
                    timing error Condition : busin = "1" AND master request = "0"
        Action    : busout := "1"
                    clcnt := ta'
                    state := STATE(Ta')

Condition : busin = "1" AND master request = "1"
        Action    : busout := "1"
                    clcnt := t1'
                    state := STATE(T1')
```

```
                                    ┌─ Master ─┐
       t1      t2        t3           t4    t1'
      <227 > <9> <      202      > < 150 > <

┌─ Slave ─┐
       ta        tb         tc      ta'
         > <   119    > < 233   > <
      <─── current bit period ───> <next bit period
```

-continued

```
Arbitration bit :
State(Tc)
        Condition   : busin = "0" AND clcnt > 1
        Action      : busout := "1"
                      clcnt := clcnt -1
                      state := STATE(Tc)

Condition   : busin = "0" AND clcnt = 1
        Action      : busout := "1"
                      timing error Condition   : busin = "1"
        Action      : busout := "1"
                      clcnt := ta'
                      state := STATE(Ta')
```

```
————————————————————————————— Master ———————
           t1      t2      t3      t4      t5      t6     t1'
           >   <   >   <   >   <   >   <   >   <   >   <
mode 0  44 (56)    9       10      25      27      57
mode 1 174 (55)   15        6      36      36      84
mode 2  87 (10)   19        9      41      10      41
```

```
———————————————————————————————— Slave ——————
           ta              tb              tc          ta'
            >       <       >       <       >      <
mode 0  86 (174)           35              84
mode 1 613 (199)           42             120
mode 2 260 ( 41)           50              51
        <———————————— current bit ————————————> next bit period
```
Values of t1 and ta in brackets refer to Master address bits, other values refer to mode bits.

Master-to-slave-bit

```
————————————————————————————— Master ————————
           t1      >   <   t2   >   <   t3   >   <   t4   >   <t1'
mode 0  0  (82)          13           36           54
mode 1  0  (55)          15           51           15
mode 2  0  (10)          19           24           19
```

```
———————————————————————————————— Slave ——————
           ta         >   <   tb   >   <   tc   >|  <ta'
mode 0 149 (221) [147]        25           60
mode 1 104 (211) [176]        33           85
mode 2  34 ( 61) [ 51]        30           24
        <————————————— current bit ——————> <next bit period
```
Values in brackets () refer to parity bit of MASTER address only. Values in brackets [] refer to:
- first bit of control field
- first bit of each data byte in case of write action
- acknowledgement bit on data in case or read action Idem as far as changed for the monitor station

```
———————————————————————————————— Slave ——————
           ta         >   <   tb   >   <   tc   >|  <ta'
mode 0 149 (221) [221]        25           60
mode 1 104 (211) [237]        33           85
mode 2  34 ( 61) [    ]       30           24
        <————————————— current bit ——————> <next bit period
```

Slave-to-master-bit
```
State(Tc)
        Condition   : busin = "0" AND clcnt > 1
        Action      : busout := "1"
                      clcnt := clcnt - 1
                      state := STATE(Tc)

Condition   : busin = "0" AND clcnt = 1
        Action      : busout := "1"
                      timing error Condition   : busin = "1" AND not last bit of the frame
        Action      : busout := "1"
                      clcnt := ta'
                      state := STATE(Ta')

Condition   : busin = "1" AND last bit of the frame
        Action      : busout := "1"
                      state := STATE(Ta of the startbit)
```

<----------current bit-------> next bit period

Values in brackets () refer:
- acknowledgement bit SLAVE to MASTER
- first bit of every data byte that is not the first data byte in a frame in case of a read action.

Idem as far as changed for the monitor station

<----------current bit------> next bit period

I claim:

1. A monitor station for use in a system which includes a single channel serial bus and a plurality of stations acting as transmitters and/or receivers, at least one of the plurality of stations being a master station and at least one of the plurality of stations being a slave station, the monitor station including
   a) clock means for timing bits or nibbles thereof;
   b) means, responsive to the clock means, for downloading bits sourced from both the master station and the slave station, from the serial bus;
   c) means for recreating at least a portion of a frame structure present on the serial bus and for reorganizing the bits downloaded, by the downloading means, into a reconstituted frame,
      i) which reconstituted frame is the same as at least a portion of a frame transmitted on the serial bus,
      ii) which frame structure
         A) includes a start signal, address signals, further signals and control signals, and
         B) supports an in-frame dialog between the master and slave stations, in that it contains both read information from and write information for the master station,
      iii) which means for recreating includes a frame buffer for storing relevant parts of the reconstituted frame; and
   c) means for inspecting and monitoring any bit stored in the frame buffer;
whereby the monitor station
   collects data from both the master station and the slave station;
   operates on a bit level;
   does not affect data on the serial bus.

2. A data communication system comprising
   at least one master station;
   at least one slave station;
   a monitor station as claimed in claim 1; and
   a serial bus for communicating between the stations.

3. A system as claimed in claim 2 wherein said frame buffer comprises first and second sections that each accommodate all relevant parts of at least one frame, and
said monitor station has control means for controlling the first section in a read mode, to provide data to a host, and the second section in a write mode, to receive data from said means for downloading bits.

4. A system as claimed in claim 2, wherein said sections are separate, fixed physical sections controlled alternatingly in said read and write modes, so that in a first time the first section is in the read mode and the second section is in the write mode and in a second time the section is in the read mode and the first section is in the write mode.

5. A system as claimed in claim 3, wherein said first and second sections are fixed in said read mode and said write mode, respectively, and comprise copy means for, between reception of contiguous frames, executing a fast copy from the second section to the first section.

6. A system as claimed in claim 2, said monitor station furthermore comprising
   masked comparator means for comparing an unmasked part from any frame communicated on said bus with one or more corresponding standard part's contents, and
   gating, responsive to the comparator means, for gating contents of the frame buffer to a test data processing means, when the comparator means gives an "equal" signal.

7. A system as claimed in claim 2, wherein said test data processing means comprises data display means for displaying test evaluation data produced by said test data processing means in response to the contents of the frame buffer.

8. A system in claim 7, wherein said data display means displays said test evaluation data symbolically.

9. A system as claimed in claim 2, wherein said clock means times bits at instants according to a timing scheme that differs from any standard station interface's.

10. (thrice amended) A monitor station as claimed in claims 2 wherein
said frame buffer comprises first and second sections that each accommodate all relevant parts of at least one frame,
said monitor station has control means for alternatively controlling the first section in a read mode, to provide data to a host, and the second section in a write mode, to receive data from the means for downloading bits.

11. A monitor station as claimed in claim 2 wherein said clock means times bits at timing instants according to a timing scheme that differs from any standard station interface's.

12. A system as claimed in claim 1, said monitor station furthermore comprising
masked comparator means for comparing an unmasked part from any frame communicated on said bus with one or more corresponding standard part's contents, and
gating means, responsive to the comparator means, for gating contents of the frame buffer to test data processing means, when the comparator means gives an "equal" signal.

13. A monitor station as claimed in claim 1 wherein said gating means is software controlled.

14. A monitor station as claimed in claim 1 for use with a single-channel serial bus with $D^2B$ protocol realised.

15. A data communications system comprising
a single channel serial bus
a plurality of transmitter and/or receiver stations, physically coupled to the bus, for intercommunicating multibit messages in the form of bus signals organized in finite frames, each frame including a contiguous sequence of signal spaces containing a start signal, address signals, further signals, control signals, and an acknowledge bit and each frame supporting an in-frame dialog which comprises both write information and read information related to one of said plurality of transmitter and/or receiver stations which is acting as a master station,
a monitor station for emulating an uncommitted receiver station with respect to a source of a first frame, which source can either be the master station or another one of said plurality of transmitter and/or receiver stations which is acting a slave station, said monitor station comprising
a) a bus interface physically coupled to said serial bus to receive said first frame at a bit level; and
b) a frame buffer coupled to said bus interface to receive said first frame including the acknowledge bit unconditionally from said bus interface and for storing relevant parts of said frame, and
c) means for inspecting and monitoring any bit stored in the frame buffer;
whereby
said monitor station does not affect data on the bus;
said monitor station monitors both sides of the in-frame dialog.

16. A monitor station for use with a data communications system comprising a single channel serial bus physically coupled to a plurality of transmitter and/or receiver stations for intercommunicating multibit messages in the form of bus signals organized in finite frames each frame including a contiguous sequence of signal spaces containing a start signal, address signals, further signals, control signals and an acknowledge bit, and each frame supporting an in-frame dialog which comprises both write information and read information related to one of said plurality of transmitters and/or receiver stations which is acting as a master station, said monitor station comprising:
a) a bus interface physically coupled to said serial bus to receive said first frame at a bit level from either the master station or one of said plurality of transmitter and/or receiver stations which is acting as a slave station; and
b) a frame buffer coupled to said bus interface to receive said first frame including the acknowledge bit unconditionally from said bus interface and for storing relevant parts of said frame, and
c) means for inspecting and monitoring any bit stored in the frame buffer;
whereby
said monitor station does not affect data on the bus; and
said monitor station monitors both sides of the in-frame dialog.

* * * * *